United States Patent [19]

Vostrovsky

[11] 4,348,165

[45] Sep. 7, 1982

[54] ASSEMBLY FOR CLAMPING MOLD TO PLATENS OF INJECTION-MOLDING MACHINE

[75] Inventor: Ernst Vostrovsky, Oberschleissheim, Fed. Rep. of Germany

[73] Assignee: Krauss-Maffei Aktiengesellschaft, Munich, Fed. Rep. of Germany

[21] Appl. No.: 190,162

[22] Filed: Sep. 23, 1980

[30] Foreign Application Priority Data

Sep. 25, 1979 [DE] Fed. Rep. of Germany ....... 2938665

[51] Int. Cl.³ .............................................. B29F 1/00
[52] U.S. Cl. .................................. 425/185; 425/190; 425/192 R
[58] Field of Search ........... 425/183, 185, 190, 192 R; 279/76, 110, 123, 1 ME

[56] References Cited

U.S. PATENT DOCUMENTS

| | | | |
|---|---|---|---|
| 2,227,796 | 1/1941 | Quillen | 279/76 |
| 2,511,350 | 6/1950 | Kosobud | 279/76 X |
| 2,736,561 | 2/1956 | Hansen | 279/76 X |

Primary Examiner—Thomas P. Pavelko
Attorney, Agent, or Firm—Karl F. Ross

[57] ABSTRACT

At an injection-molding machine, an assembly for clamping a mold half to a platen comprises a bore therein and a projection on a substantially planar face of the mold half. The projection includes an annular flange insertable into the platen bore and an annular groove defined in part by an inclined or beveled surface of the flange. A pair of sliding plates are reciprocatably mounted in the platen for shifting from withdrawn positions inwardly to locking positions, the plates having beveled inner edges for coacting with the inclined flange surface to clamp the mold half to the platen. The bore is advantageously formed with a conical extension for accepting the head or nozzle of an injection device or extruder. Another mold half may be clamped in an analogous manner to another platen provided with a bore and reciprocatably mounted locking plates, the two platens being shiftable relatively towards each other.

3 Claims, 3 Drawing Figures

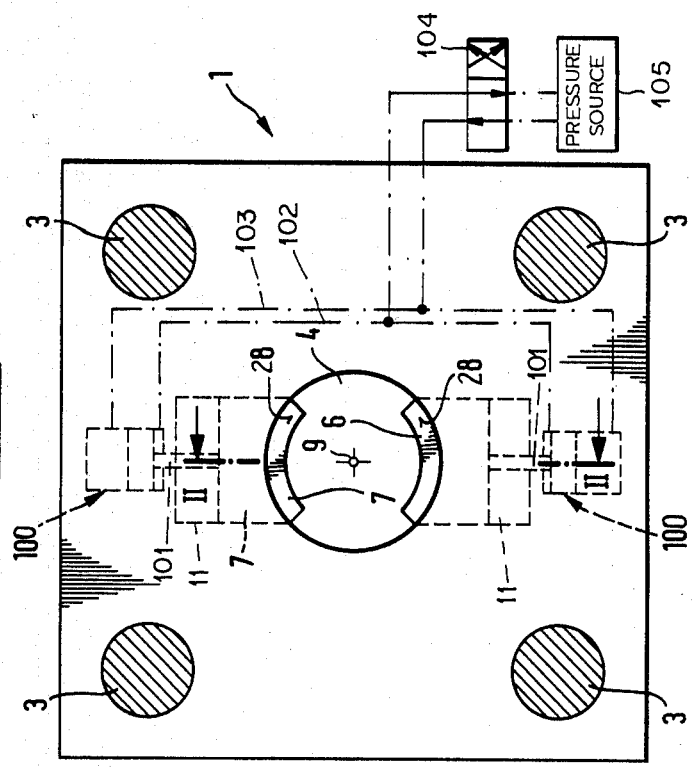
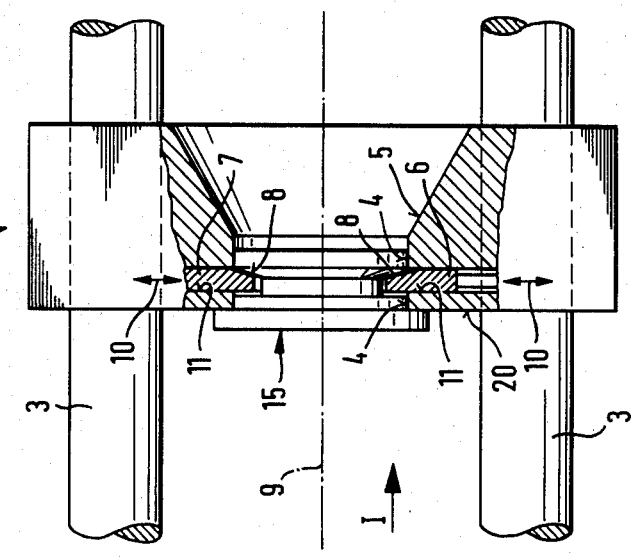

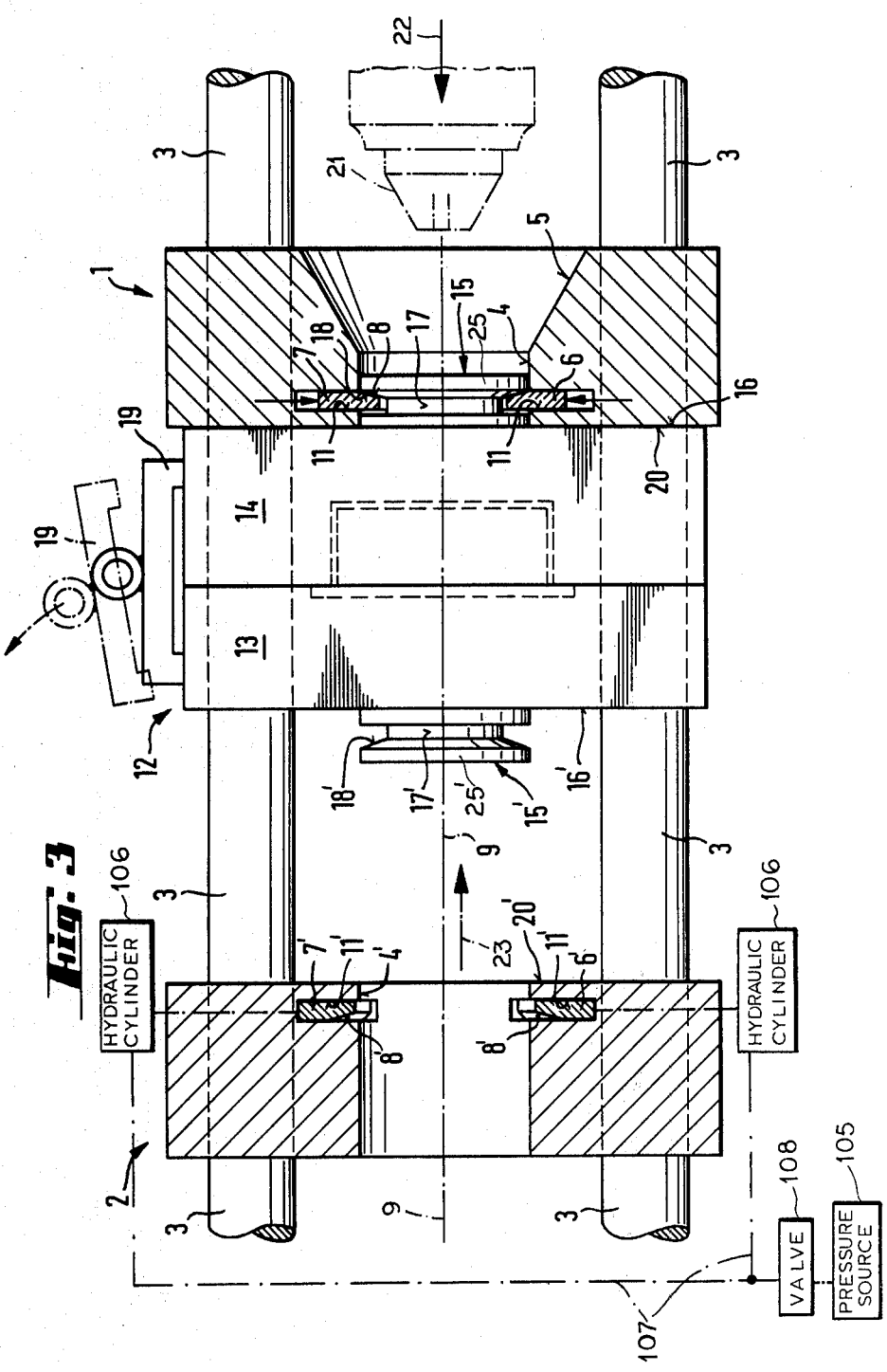

ASSEMBLY FOR CLAMPING MOLD TO PLATENS OF INJECTION-MOLDING MACHINE

FIELD OF THE INVENTION

The present invention relates to an injection-molding machine. In particular, the present invention relates to a clamping assembly for fixing an injection mold to the platens of such a machine.

BACKGROUND OF THE INVENTION

An injection mold is generally clamped to the platens of an injection-molding machine by screws or bolts and other devices whose actuation and release frequently require a substantial amount of time. The exchange of molds results in lengthy work stoppages.

In addition, clamping devices such as template-formed bores are expensive and time-consuming.

OBJECTS OF THE INVENTION

The principal object of the present invention is to provide an improved clamping assembly which reduces mold-exchange times.

Another object of the present invention is to provide such an assembly which is easily formed.

SUMMARY OF THE INVENTION

At an injection-molding machine, an assembly for anchoring a mold half comprises, according to the present invention, a platen provided with a bore and a projection rigid with a side of the mold half, the projection being formed with a flange insertable into the bore. A gripper is mounted on the platen for locking the mold half thereto by engaging the flange upon an insertion of the projection into the platen bore.

According to another feature of the present invention, the projection extends substantially perpendicularly from a planar surface of the mold half and the flange defines on the surface of the projection a groove extending substantially parallel to the mold-half surface. The gripper includes a plurality of sliding members reciprocatably mounted in the platen for shifting radially with respect to the projection and parallel to the planar surface to at least partially enter the groove upon insertion of the projection into the platen bore.

According to another feature of the present invention, the sliding members in the platen are each in the form of a plate having an extremity provided with a beveled camming surface, the flange including an inclined camming surface which forms a side of the groove. Upon an inward shift of the sliding plates, the camming surfaces engage each other and exert a force on the mold half to clamp the same to the platen.

Pursuant to further features of the present invention, the flange and the groove are substantially annular and the bore is formed with a conical extension for receiving an extruder nozzle or injector head.

BRIEF DESCRIPTION OF THE DRAWING

These and other features of the present invention will now be described in detail, reference being made to the accompanying drawing in which:

FIG. 1 is a partially schematic front-elevational view of a platen in an injection-molding machine, this platen having mold-locking plates according to the present invention;

FIG. 2 is a partially elevational and partially broken-away side view of the platen of FIG. 1, showing a mold-clamping assembly according to the present invention; and FIG. 3 is a partially elevational and partially broken-away side view of a pair of platens and a mold at an injection-molding station, showing the mold-clamping assembly of FIG. 2.

SPECIFIC DESCRIPTION

As illustrated in FIGS. 1 and 2, a stationary platen 1 at an injection-molding machine including, for example, an extruder nozzle 21 (FIG. 3) is rigid with several bars or rods 3 which serve as guide rails for a movable platen 2 (FIG. 3). Platen 1 is provided with a centrally located cylindrical bore 4 communicating with a conically shaped bore extension 5 which receives extruder head or nozzle 21, as indicated in FIG. 3 by an arrow 22.

Platen 1 has a pair of recesses 11 extending radially from bore 4 and serving as guides for respective locking plates 6, 7 reciprocatably mounted (see arrows 10, FIG. 2) for co-acting in a jaw-like action to clamp a mold half 14 (FIG. 3) to platen 1, as described in detail hereinafter. Plates 6, 7 are formed at their inner peripheries with circularly curved end portions 28 having beveled surfaces 8 facing conical bore 5.

As illustrated in FIG. 1, plates 6, 7 are rigid with plungers 101 of respective hydraulic cylinders 100, these cylinders being connected via a pair of fluid-channeling conduits 102, 103 and a valve 104 to a source of fluid pressure 105. Valve 104 is operated preferably by an electromagnet (not shown). Alternative means for reciprocating plates 6, 7 in guide recesses 11 include pneumatic cylinders, leverage systems and electromagnetic coils.

As shown in FIG. 3, an injection mold 12 securable to platens 1, 2 prior to extrusion or injection operations comprises mold halves 13, 14 normally clamped to each other by a bracket or crosstie 19 for facilitating transport. Mold halves 14, 13 include oppositely extending projections 15, 15' formed with respective annular flanges 25, 25' which define circular grooves 17, 17' in the projections. Flanges 25, 25' have inclined surfaces 18, 18' forming outer sides of grooves 17, 17'.

Platen 2 is provided with a cylindrical bore 4' from which two rectangular slots or recesses 11' extend, these recesses serving as guides for respective locking or clamping plates 6', 7' similar to plates 6, 7. Plates 6', 7' have circular inner peripheries formed with beveled surfaces 8' facing away from platen 1.

Prior to the fastening of mold 12 to platens 1 and 2, valve 104 is actuated to charge cylinders 100 via conduit 102, thereby withdrawing the ends 28 of plates 6, 7 from bore 4. It is clear that recesses 11 (and 11') have a depth sufficiently great to receive the total lengths of plates 6, 7 (and 6', 7').

Upon the placement of mold 12 between spaced platens 1, 2, projection 15 is aligned with and subsequently inserted into bore 4. Valve 104 is then actuated to pressurize cylinders 100 via conduit 103, this pressurization causing the extension of plungers 101 and the concomitant shifting of plates 6, 7 from withdrawn positions inside recesses 11 to partially extended positions in which plate ends 8 are inserted inside groove 17 and beveled surfaces 8 cammingly engage inclined surfaces 18. The camming coaction of surfaces 8 and 18 results in a force exerted on mold half 14 in a direction parallel to an axis of symmetry 9 of platens 1, 2, as indicated in FIG. 3 by an arrow 23. This force clamps mold half 14 to platen 1 and, more particularly, an external mold surface 16 to an external planar surface 20 of platen 1 (FIG. 3).

Upon the fixing of mold half 14 to stationary platen 1 by the shifting of locking plates 6, 7, movable platen 2 is slid along guide rails 3 in the direction of arrow 23, locking plates 6', 7' being completely withdrawn from bore 4' through the operation of a hydraulic actuation system including cylinders 106, conduits 107, valve 108 and pressure source 105 (see FIG. 3). With the subsequent insertion of projection 15' into bore 4', valve 108 and pressure source 105 operate cylinders to drive locking plates 6', 7' into groove 17'. Beveled surfaces 8' cammingly engage inclined surfaces 18' to clamp an external surface 16' of mold half 13 to an external planar surface 20' of platen 2.

Upon the clamping of mold portions 13, 14 to platens 2, 1, bracket 19 may be removed from mold 12, as indicated by dot-dash lines in FIG. 3.

As a final step in preparation for injection operations, extruder head 21 is inserted into conical bore 5. Alternatively, the extruder may be stationary and both platens 1, 2 movable along guide bars 3, whereby mold 12 together with the platens 1, 2 is shifted to an injection station at the mouth or nozzle 21 of the extruder.

In cases where the mold is especially large, platens 1 and 2 are each advantageously provided with a plurality of bores preferably disposed symmetrically with respect to axis 9, each bore being equipped with respective locking plates and hydraulic actuators.

I claim:

1. In an injection-molding machine, the improvement which comprises in combination:
   a pair of separable mold halves jointly defining a mold cavity and having oppositely directed sides each formed with a respective projection along an axis, each of said projections having an annular flange defined by an outwardly open annular groove separating the respective flange from the respective side, each flange having a beveled camming surface defining a flank of the respective groove;
   a pair of relatively movable platens on said machine spaced apart along said axis and receiving said mold halves between them, each of said platens having a bore receiving a respective one of said projections;
   respective gripper means on each of said platens engageable with the projection of a respective mold half for form-locking and force-locking retention thereof on the platen, each of said gripper means including:
   a plurality of sliding members reciprocatingly shiftable on the respective platen toward and away from said axis and engageable in the groove between the flange and said side of the respective mold half;
   means for displacing said sliding members on the respective platen for engaging and releasing the respective projection, selectively, and
   further beveled camming surfaces on said members engageable with the said camming surface of the respective flange to press said side of the respective mold half against the respective platen.

2. In an injection-molding machine, an assembly for anchoring a mold half having a projection rigid with and extending from a side of the mold half and formed with a flange transverse to said projection, said assembly comprising:
   a platen on said machine provided with a bore adapted to receive said projection; and
   gripper means on said platen engageable with said projection for form-locking and force-locking retention thereof on said platen, said gripper means including:
   a plurality of sliding members reciprocatingly shiftable on said platen toward and away from an axis of said bore and engageable between said flange and said side of said mold half,
   means for displacing said sliding members on said platen for engaging and releasing said projection, selectively, and
   camming surfaces on said members engageable with a surface of said flange to press said side of said mold half against said platen.

3. The assembly defined in claim 2 wherein said flange is formed between an annular groove around said projection and said side of said mold half, said camming surfaces on said members being beveled surfaces converging toward said axis away from said side of said mold half, said flange being formed with a beveled camming surface defining a flank of said groove and cooperating with said camming surfaces of said members for drawing said side of said mold half against said platen.

* * * * *